United States Patent [19]

von der Neyen

[11] 4,151,475

[45] Apr. 24, 1979

[54] COMPENSATION CIRCUIT FOR MULTI-PATH PROPAGATION DISTORTION IN BINARY FREQUENCY MODULATED SIGNALS

[75] Inventor: Jans-Jürgen von der Neyen, Munich, Fed. Rep. of Germany

[73] Assignee: Siemens Aktiengesellschaft, Berlin & Munich, Fed. Rep. of Germany

[21] Appl. No.: 886,679

[22] Filed: Mar. 15, 1978

[30] Foreign Application Priority Data

Mar. 31, 1977 [DE] Fed. Rep. of Germany ....... 2714439

[51] Int. Cl.² ............................................ H04L 27/14
[52] U.S. Cl. .................................... 329/105; 325/320; 325/347; 325/349; 325/474; 325/482; 329/132; 329/136; 329/147
[58] Field of Search ......... 329/104, 105, 110, 131–133, 329/136, 146, 147; 325/320, 347, 349, 472, 473–477, 480, 482

[56] References Cited

U.S. PATENT DOCUMENTS

| 3,168,699 | 2/1965 | Sunstein et al. | 325/472 |
| 3,293,551 | 12/1966 | Ehrich | 325/320 |
| 3,348,153 | 10/1967 | Featherston | 329/104 X |
| 3,351,859 | 11/1967 | Groth, Jr. et al. | 325/473 X |
| 3,383,600 | 5/1968 | Calfee | 325/320 |
| 3,537,008 | 10/1970 | Lakatos | 325/474 X |

Primary Examiner—Siegfried H. Grimm
Attorney, Agent, or Firm—Hill, Gross, Simpson, Van Santen, Steadman, Chiara & Simpson

[57] ABSTRACT

A receiving system for digital communication signals modulated on a carrier in the form of binary frequency modulation in a propagation medium which is affected by reflections in which the information losses occurring as a result of phase and amplitude distortions are automatically determined by two mutually supplemental arrangements. One of these arrangements includes in a first branch a frequency discriminator after which is connected a device for recognizing interference peaks caused by reflection distortions and further including a circuit which compensates for these interference peaks. The other arrangement contains an amplitude demodulator which is connected in parallel to the frequency demodulator in a second branch. The outputs of both branches are supplied to a switch which is controlled by an amplitude modulation evaluation device which at a recognizable amplitude modulation of sufficient magnitude connects the second branch to a common output, and at a recognizable frequency modulation connects the first branch to this output.

7 Claims, 4 Drawing Figures

COMPENSATION CIRCUIT FOR MULTI-PATH PROPAGATION DISTORTION IN BINARY FREQUENCY MODULATED SIGNALS

CROSS REFERENCES TO RELATED APPLICATIONS

This application relates to application Ser. No. 810,904, entitled "A System For Reception of Frequency Modulated Digital Communication Signals" filed June 28, 1977 in which the inventors are Josef Gammel, Karl Kammerlander, and Hans-Jürgen von der Neyen assigned to the same assignee of the present application.

BACKGROUND OF THE INVENTION

1. Field of the Invention

This invention relates in general to a system for receiving digital communication signals which are modulated on a carrier in the form of binary frequency modulation in a reflection affected propagation medium and in particular for a reception at mobile stations on long distance connections and scattered beam connections.

2. Description of the Prior Art

In digital communication transmission systems under heavily disrupted propagation conditions (multi-path propagation) the range is approximately inversely proportional to the bit rate to be transmitted. The limiting case determining the range is represented by the total signal extinction which as a consequence of the different transit times (propagation times) is caused by the indirect propagation path. The differential time delay of the reflected wave and the direct path amount at the reception point to 180° out of phase and therefore the waves mutually cancel each other. In a wide range before this limiting case occurs information losses occur as a result of the delay time distortion and amplitude distortion which give rise to very high error rates in data transmission.

SUMMARY OF THE INVENTION

So as to obtain substantial improvement of the transmission quality in these areas and in this manner to ultimately achieve an improvement in the range of digital communication systems with binary frequency modulation in particular between mobile stations and with a constantly varying propagation situation, it was proposed in co-pending application Ser. No. 810,904 to automatically detect the information losses occurring as a result of phase and amplitude distortions according to their causes in two mutually supplementary arrangements: one of which has a frequency discriminator behind which is connected a device for recognizing the interference peaks caused by reflection distortions as well as having a circuit which compensates for these interference peaks. The other arrangement contains an amplitude demodulator which is connected in parallel to the frequency demodulator in a second branch. In the process, the outputs of both demodulators are supplied to a switch which is controlled by an amplitude demodulation device which at a recognizable amplitude modulation of sufficient modulation index connects the amplitude demodulator to a common output and at a recognizable frequency modulation connects the frequency discriminator together with the interference peak recognizor to this output. The output of the AM demodulator has a polarity inverter connected behind it which is controlled by a polarity integrator which determines the polarity of the AM demodulation products as a function of the level of the FM demodulation product which belongs to the higher level of demodulated AM signal.

This proposed system has the underlying realization that the distortion caused as a consequence of multi-path propagation in binary frequency modulated digital communication signals are essentially expressed by two interference forms which can be clearly distinguished from each other especially with narrow band systems when the FM modulation index is smaller than one.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
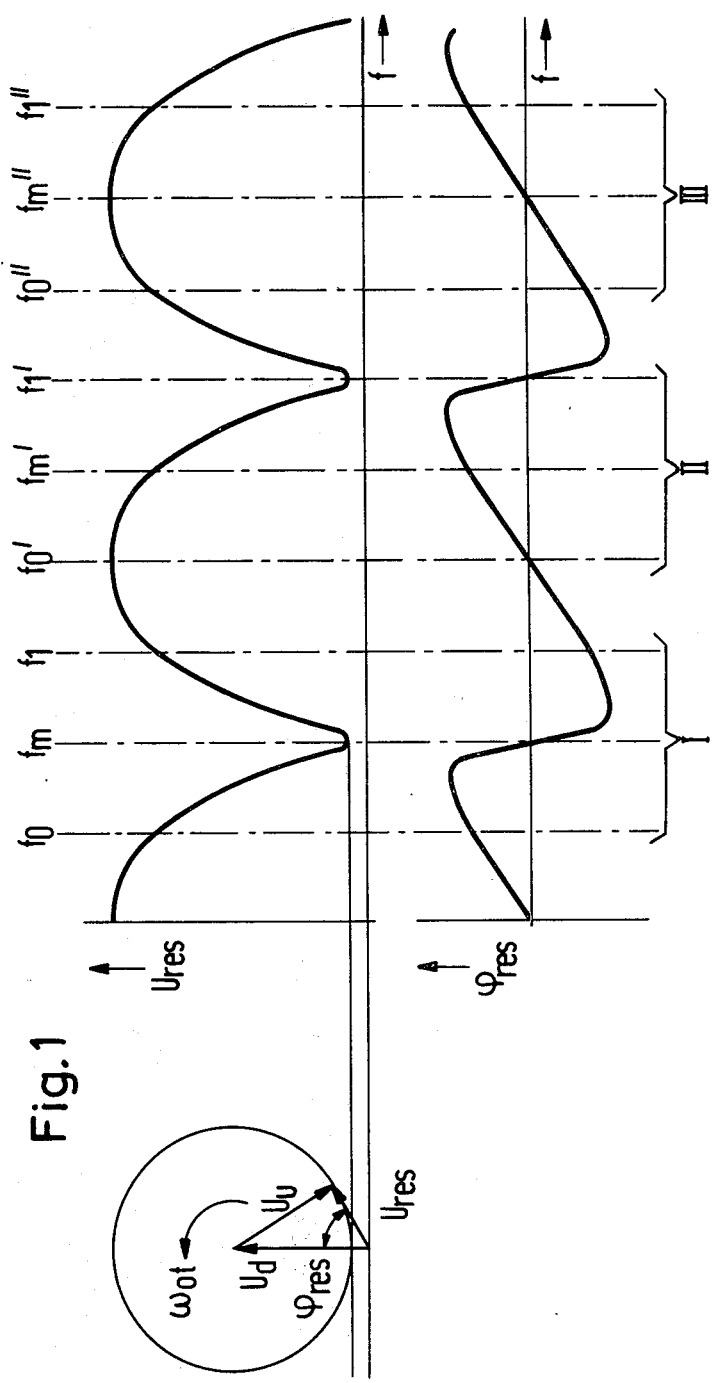
FIG. 1 is a waveform diagram describing the effects of multi-path propagation.

FIG. 1 is of assistance in understanding multi-path propagation in binary frequency modulated digital communication systems.

FIG. 1 illustrates the frequency dependence of signals for the cases I, II and III. The amplitude characteristic of the signal voltage $U_{res}$ which result from the multi-path reception is plotted in the upper diagram. The resulting phase $\phi_{res}$ is plotted in the diagram directly beneath this diagram. Left besides the upper diagram, a phasor diagram is drawn additionally which indicates the way how the received signal voltage, specifically the directly received signal voltage $U_d$, and the signal voltage $U_u$ received over an indirect path add to each other so that the resulting received signal voltage $U_{res}$ is obtained.

As soon as the delay time differences of the signals incident at the point of reception of the direct ray and of the indirect ray are of the order of magnitude of the bit time the frequency difference of the minima of the distribution characteristic becomes so small that within the modulation deviation, the energy of the received signal can fluctuate almost arbitrarily with the modulated speed and as a function of the radio frequency $\omega_{ot}$ and the depth of the minima. A consequence of these energy fluctuations caused by the phasor addition of the incident signals which are suppressed in the amplitude limiter of the reception system before demodulation are rapid phase alterations of the resulting signals which are necessarily generated because of phasor addition. These rapid phase alterations can naturally not be suppressed by the amplitude limiter and they, therefore produce a bit synchronous interference modulation at the output of the FM demodulator. The magnitude of this interference modulation can exceed the useful modulation by many times and, thus, destroys the detectability of the useful information.

The maximum phase speed of the resulting signal voltage occurs in the minima of the distribution characteristic increases with decreasing signal voltage at the minimum. In the ultimate case, at selective total cancelling, the phase speed can be arbitrarily large.

Depending on a function of whether the minimum is located in the middle of the frequency deviation range which in the case of the assumed modulation index being less than 1 is defined by the two sign frequencies or whether it is located in the vicinity of one of the sign frequencies the two different interference forms mentioned above occur. In FIG. 1, the sign frequencies for the three characteristic cases I, II and III are designated as $f_0/f_1$, $f_{0'}/f_{1'}$ and $f_{0''}/f_{1''}$. The mean frequency between the respective sign frequencies is indicated by $f_m$ $f_{m'}$ and $f_{m''}$.

(a) Minimum in the vicinity of a sign frequency in the deviation range

If the minimum is located inside or outside the deviation range but in the vicinity of one of the two sign frequencies, then the received energy at this sign frequency will be relatively small. The received energy at the other sign frequency is necessarily higher but on the other hand since it lies closer to the next maximum of the resulting signal voltage $U_{res}$, this results in clear unequivocal bit-synchronous amplitude modulation occurring in the received signal ahead of the limiter and the polarity of the amplitude modulation depending on the position of the minimum is either in the same position or in an inverted position relative to the original modulation signal. The limiting which precedes demodulation customary with frequency modulation suppresses this amplitude modulation. Thus, the amplitude modulation does not become effective at the output of the demodulator. By contrast, the phase change occurring in the vicinity of the minimum when a change in polarity occurs is effective and it expresses itself as a large polarity distortion at the output of the demodulator. In case II, illustrated in FIG. 1, the sign frequency $f_{1'}$ is in the minimum and the sign frequency $f_{0'}$ is at a maximum of the frequency dependent receiving characteristics of the signal voltage $U_{res}$. If the energy of the cutoff frequency $f_{1'}$ falls below the internal noise level of the receiver, then a very essential limiting case of the operating characteristic is obtained. As a consequency of the negative signal to noise ratio at one of the sign frequencies, there appears instead of a logic symbol which correspond to this sign frequency (zero or one), only noise at the limiter and demodulator output. The signal demodulated with the FM demodulator will thus become unuseable. However, even in this situation the received signal in front of the limiter has a bit synchronous amplitude modulation so that using this amplitude modulation as far as responding to amplitude is available, a regeneration of the received signal is possible.

(b) Minimum with the deviation range near the mean frequency

If the frequency occurs in the middle area of the deviation range given by the two sign frequencies, then the interference caused by multi-path reception is shown in the following description. The phase alteration speed at the minimum is indicated at the limiter output and the demodulator output as frequency offset and can reach a multiple of the useful deviation. The duration of the deviation error depends on the modulation speed and on the relative depth of the minimum. If as a consequency of this interrelationship, the duration of the deviation error is smaller than the bit duration then this error deviation will show up with a sign interval as a peak voltage the size and characteristic of which depends on the depth of the minimum. The distortion peaks do not necessarily occur within each individual bit, however, but only at the time of the polarity change since it is exclusively in this process that the deviation range is passed through. In FIG. 1, in this case, in which the minimum at frequency $f_m$ occurs in the middle between the two cutoff frequencies $f_0$ and $f_1$ as indicated by I. This kind of interference can be eliminated to a great extent in that the interference peaks which occur are suppressed at the output of the frequency demodulator.

Case III illustrated in FIG. 1 represents practically the undisturbed reception of energy in which the two cutoff frequencies $f_{0''}$ and $f_{1''}$ occur at both sides of the maximum with sufficient amplitude and the amplitude modulation which is caused by phase distortion is practically negligible.

Figure 2:
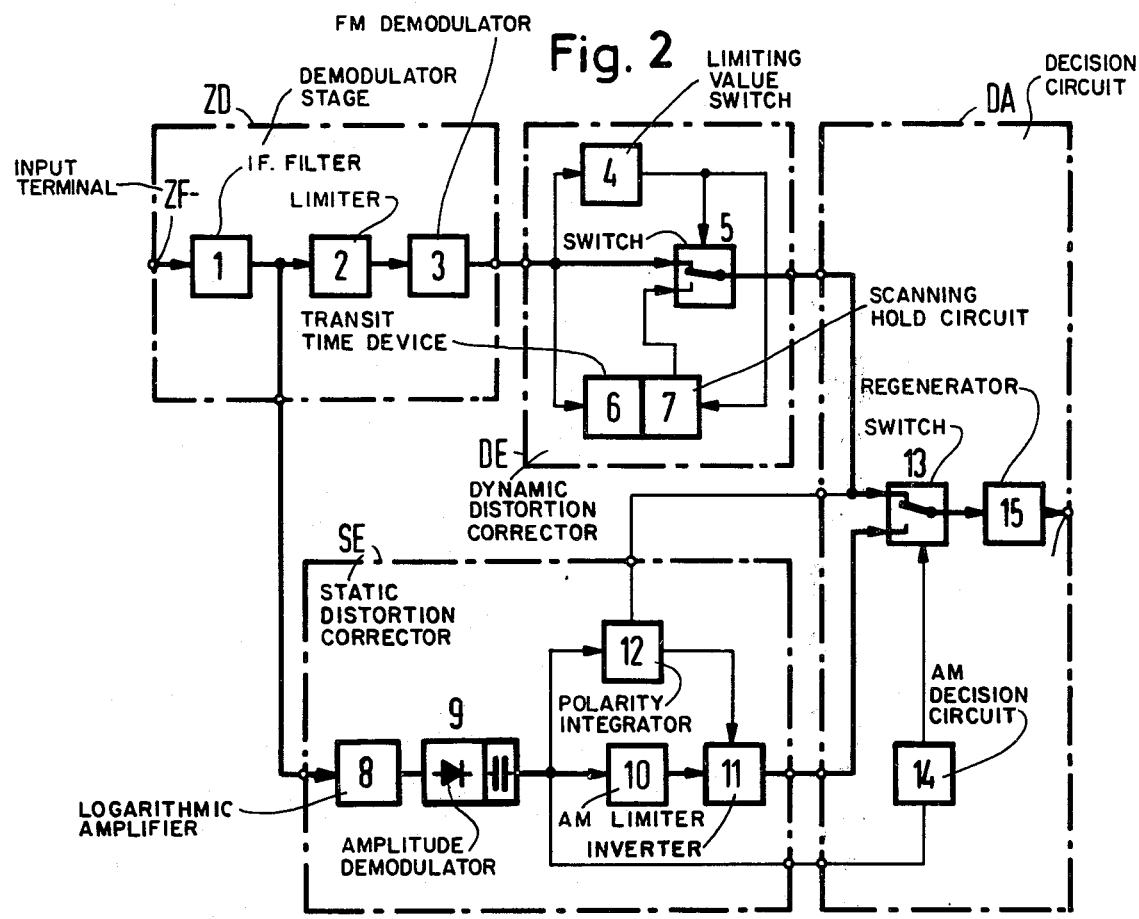
FIG. 2 is a receiver block diagram according to patent application Ser. No. 810,904.

FIG. 2 of the drawings comprises a block diagram of the basic circuit of a system for receiving frequency modulated digital communication signals with built in interference suppression according to the referenced co-pending application. The specification and drawings of this co-pending application are hereby incorporated by reference. The input terminal ZF from an intermediate frequency stage is supplied to a demodulator stage ZD which forms a portion of a conventional receiver. The IF signal is fed to a IF filter 1 whose output is connected to a limiter 2 which supplies an output to a FM demodulator 3. A static distortion corrector SE also receives the output of the IF filter 1 so as to suppress interferences of the type described under paragraph (a) above. The output of the FM demodulator 3 is connected to the input of a dynamic distortion corrector DE which suppresses the interferences illustrated under paragraph (b) above in conjunction with multipath propagation. The outputs of the dynamic distortion corrector DE and the static distortion corrector SE supply outputs to a data decision circuit DA connected at their outputs and to which the received signal is applied which has been cleared of interfering signals.

The distortion corrector DE includes a two position switch 5 which has one contact to which the output signal of the FM demodulator 3 is supplied and during interference free FM reception the output of the FM detector 3 passes through switch 5 directly to the decision circuit DA. During such condition, this passes through the two position switch 13 of the data evaluation circuit DA which supplies its output to the regenerator 15 and the output of the regenerator 15 is supplied to the data output terminal.

Under conditions when interference illustrated according to paragraph (b) above which are considered to be dynamic distortions occur, the limiting value switch 4 in the dynamic evaluator DE receives the output of the FM demodulator 3 and the switch 4 produces an output that is supplied to the switch 5 so as to change its position from the input shown in FIG. 2 so that the moveable switch contact moves to its second position so that the switch is connected to the output of the scanning hold circuit 7. The switch 5, for example, might be a magnetically controlled switch and when the output of the switch 4 is furnished to the switching coil of the switch 5 it changes its position. The output of switch 4 is also supplied to the scanning hold circuit 7. A transit time device 6 also receives the output of the FM demodulator 3 and supplies an input to the scanning hold circuit 7 and the output of the scanning hold circuit 7 is connected to the second contact of switch 5. Thus, at instances when an output is supplied by the limiting value switch 4, there will be present at the scanning hold circuit 7, a delayed signal whose momentary value corresponds to that of the demodulated signal before it exceeded the limiting value in a first approximation. For the duration of the time when the limiting value is exceeded, this momentary value is stored in the scanning hold circuit 7 and is supplied into the data flow through the second contact of switch 5. In this manner, the energy content of the original bit is maintained and its detection is assured in regenerator 15.

In case of interference according to paragraph (a) described above, which is considered as static distortion, the IF signal from the IF filter 1 has a bit synchronous amplitude modulation. This AM signal is fed from the IF filter 1 to the AM demodulator 9 through a logarithmic amplifier 8. The output of the amplitude demodulator 9 is provided with a capacitor for separating the DC and the alternating portions of its output signal. The output signal of amplitude demodulator 9 from which the DC signal portion has been removed by the capacitor is fed to a AM limiter 10 which supplies at its output an input to a controllable inverter 11. The output of the controllable inverter 11 is connected to the second fixed switch contact of the switch 13. Thus, the switch 13 is either connected to the output of switch 5 or to the output of controllable inverter 11. The polarity of the demodulated AM signal at the outputs of the amplitude demodulator 9 and at the output of the AM limiter 10 will either be in phase or out of phase with the demodulated FM signal at the output of switch 5 depending on whether the one or the other of the two cutoff frequencies has been cancelled as defined above. So as to create the necessary unambiguous conditions, the respective detectable portions of the FM demodulated signal is compared with the AM demodulated signal in the polarity integrator 12 and the inverter 11 which is controlled by the output of the polarity integrator 12 so as to switch it over as required.

As illustrated in FIG. 2, the output of the amplitude demodulator 9 of the static distortion corrector SE is connected to the input of the AM decision circuit 14 which is part of the data evaluation circuit DA and which automatically checks whether an error free bit synchronous amplitude modulation is present. Only in the case of the error free bit synchronous amplitude modulation being present the AM deciding circuit moves the moveable contact of switch 13 to the output of the inverter 11 with a suitable magnetic control, for example, so that the data obtained from the amplitude demodulator from the received signal will then be fed to the regenerator 15. For proper operation of the receiver arrangement illustrated in FIG. 2, it is necessary that the automatic switching from one of the distortion correcting systems to the other that is the switching over between the dynamic distortion corrector DE and the static distortion corrector SE can occur at the speed at which such interferences occur.

Relative to FIG. 1, the initial assumption was that the transmitter and receiver are stationary so that the received signal level will be essentially dependent in its energy distribution on the frequencies being used. A shifting of the minimum out of the frequency deviation range or into the frequency deviation range, can in the case of rigidly prescribed radio frequencies come about as a result of local changes of the reflectors or from fluctuations of the reflection and refraction phenomena in the course of the multi-path reception such as in ionospheric and tropospheric scatter reception. In general, these changes occur at relatively small velocities. The conditions are different when transmitter and receiver are mobile during operation as for example, when mobile operating terminal stations on moving vehicles. In this case, the received signal levels respond not only to the frequency-wise energy distribution but also additionally respond to the location dependent energy distribution which is interrelated therewith, the local spacing of the minima of the energy distribution is directly proportional to the radio frequency wavelength being used. In other words, in mobile operation under the influence of longer paths with fixed reflectors, the respective degree of distortion changes depending on the location with the relative speed of transmission and reception of the vehicles, and depends as a function on the radio frequency wavelength being used. For example, using a radio frequency of 300 MHz corresponding to a half wavelength of 0.5 m where the vehicle is moving at a velocity of ten meters per second (36 km/h) 20 minima per second will pass through a mobile station. As shown in FIG. 1, the scope of the distortions can be illustrated if the frequency axis is replaced by a time axis and the modulated band between the frequency $f_0$ and $f_1$ represented in case I is shifted to the right for example with a speed such that the time for passing through an amplitude and phase wave last for 1/20 of a second or where 20 such waves per second pass through with uniform speed. The distinctive cases of I, II and III illustrated in FIG. 1 will, thus, change from one to the other in rapid sequence corresponding to the traversing of the spatial distribution and will repeat themselves with corresponding period. The speed of substitution of the dynamic distortion corrector DE illustrated in FIG. 2 depends on the reaction time and the processing time of the integrated components used therein and thus the dynamic distortion correction is substantially faster than the maximum expected path change length between the transmitter and receiver.

The conditions are different with regard to the static distortion corrector SE. The logarithmically evaluated and rectified IF signal tapped off before the limiter where the bit synchronous alternating voltage necessary for obtaining the AM data is separated and which is demodulated by the amplitude demodulator 9 and supplied through the capacitor which removes the DC voltage which corresponds to the mean field strength. If during mobile operations, the mean field strength periodically changes then as a result of charging and discharging time constant of the capacitor the magnitude of the signal voltage occurring at the output of the amplitude demodulator 9 will be in error in those cases where the time constant are no longer negligibly small due to the alteration speed of the mean field strength. These variations of the alternating voltage make it more difficult to evaluate the AM data.

The invention has the underlying objective of further developing the system according to the above referenced co-pending application with regard to the static distortion corrector and has an objection that the error free automatic switch over is assured even if the different interference phenemona follow one another in rapid succession as is especially the case with a relative movement between transmission and reception stations for mobile operation.

The system according to the co-pending application referenced above, is modified according to the present invention such that the AM demodulator includes and has at its output an alternating voltage separation circuit which includes at its input first and second sampling circuits connected in parallel and wherein the first sampling circuit is controlled directly and the second sampling circuit indirectly by way of a switch by pulses derived at the receiver from the incoming signal and which contains a subtracting means at the output which has two inputs connected to the outputs of the sampling circuits. The invention further includes the provision that the switch for the pulse supplied to the second sampling circuit is energized as a function of the changes in amplitude characteristic of the output signal of the first sampling circuit.

The present invention is based on the realization that the alternating voltage distortion which occurs in the case of an ordinary alternating voltage separation using a capacitor as a coupling means results when there are rapid changes in the mean field strength. This will cause improper operation of the A.M decision circuit 14 illustrated in FIG. 2, and, thus, interferes with the proper timing of the switch 13 and also additionally, as a consequence of unsymmetrical pulse duty factors of the bit stream at the output of the AM demodulator 9 will cause the integration output of the polarity integrator to have an error. The evaluation of the data obtained by way of the amplitude modulation becomes very difficult due to these factors.

In the present invention a low pass filter is mounted at the input of the second sampling circuit path to the substractor so as in this manner to smooth the path changes to the same magnitude proportional to the mean field strength to a degree which is favorable for functioning of the complete system.

The control signal for the pulse feed supply to the second sampling circuit as a function of the changes of the amplitude characteristics of the output signal of the first scanning circuit is obtained in an advantageous manner by providing that the control input of the switch is connected to the output of the first sampling circuit through a differentiator that might possibly be linked with a pulse shaping stage.

Figure 3:
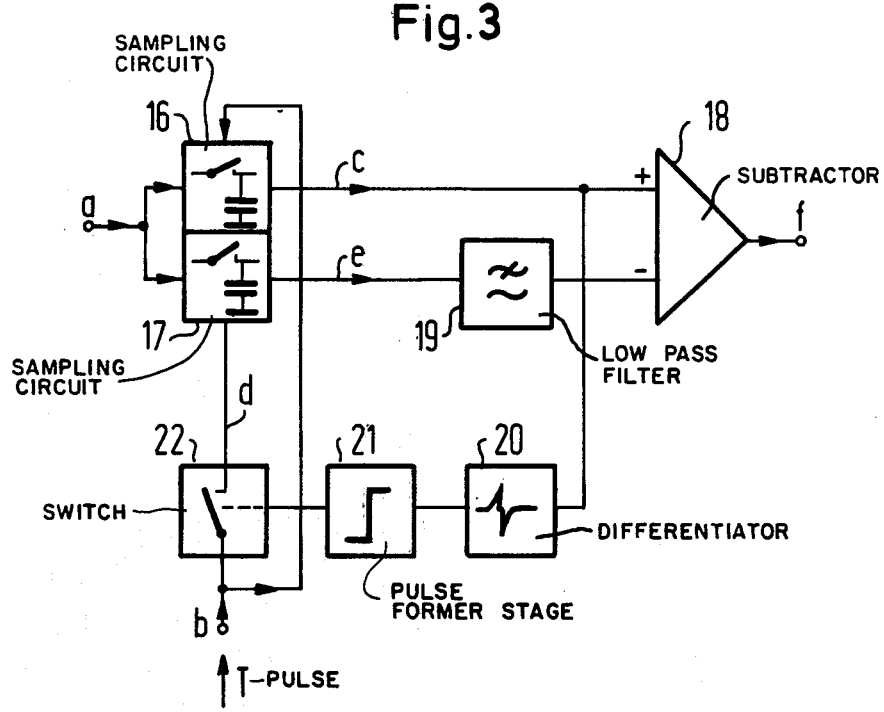
FIG. 3 is a functional block diagram of the alternating voltage separation circuit according to the invention.

FIG. 3 illustrates the alternating voltage separation circuit of the invention which replaces the capacitor coupling at the output side of the amplitude demodulator of the static distortion corrector SE of the co-pending system illustrated in FIG. 2. The alternating voltage separation circuit illustrated in FIG. 3 has two sampling circuits 16 and 17 to which the demodulated signal is respectively fed to their inputs as illustrated from terminal a. Both of the sampling circuits 16 and 17 are controlled by a pulse T derived from the incoming signal. Specificially sampling circuit 16 receives the pulse T directly from terminal b and sampling circuit 17 receives the pulse T indirectly through a switch 22 on lead d. The output of the alternating voltage separation circuit includes a substractor 18 which receives a first input on lead c from sampling circuit 16 and a second input from a low pass filter 19 which receives the output on lead e from sampling circuit 17. The switch 22 is controlled in position by the output of the sampling circuit 16 through differentiator 20 and the pulse former stage 21.

Figure 4:
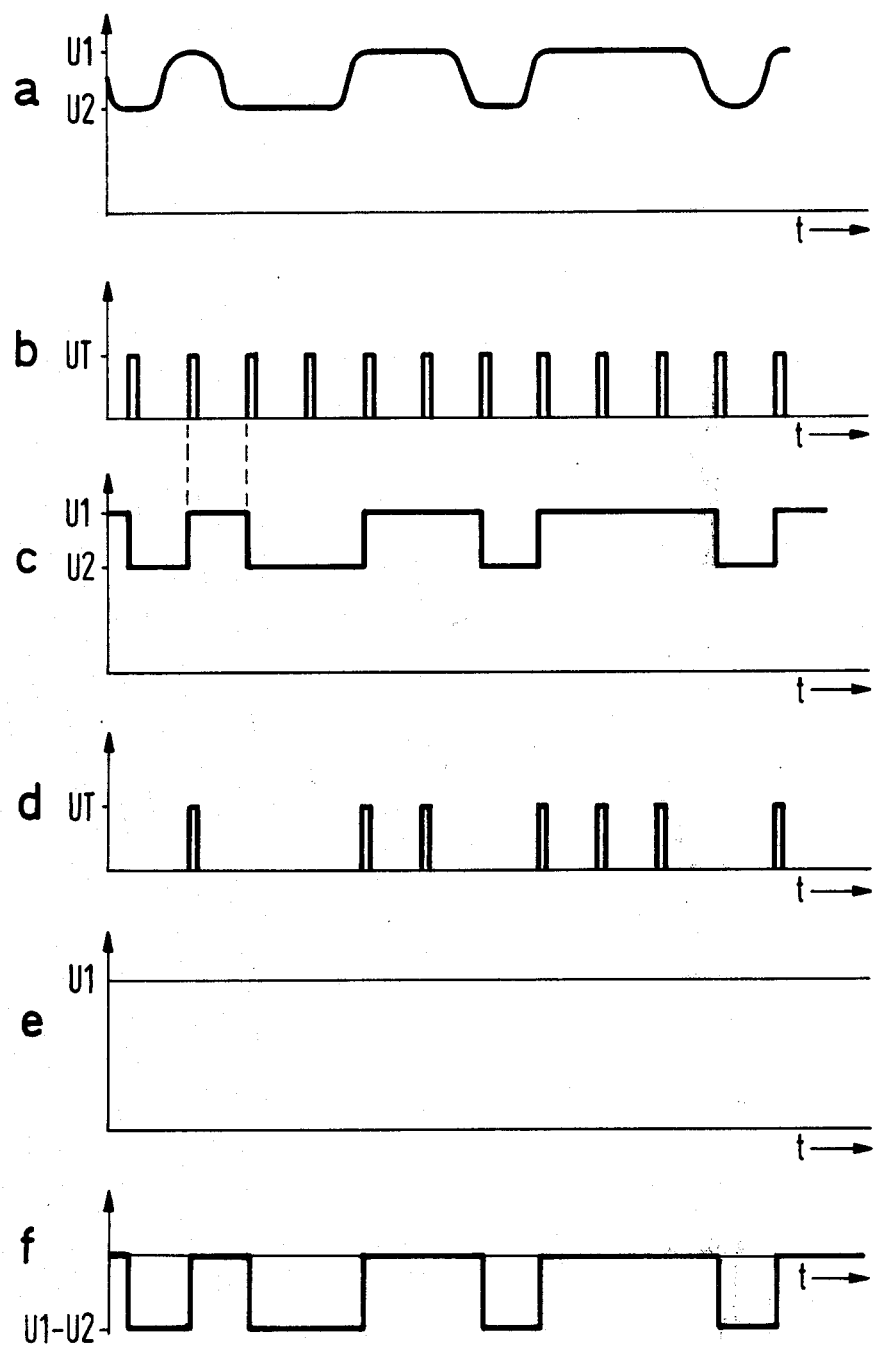
FIG. 4 illustrates voltage diagrams for explaining the functioning of the alternating voltage separation circuit according to FIG. 3.

The voltage response characteristics illustrated in FIGS. 4a through 4f are plotted against time t and represent the voltage response characteristics at the corresponding designated locations in circuit 3 as indicated by the letters a through f. For example at input point a, the input demodulated signal appears which represents a data flow current which fluctuates between the values of the voltages $U_1$ and $U_2$. Respectively, in the middle of a bit this input signal is sampled in a pulse shaped manner by the pulse having the pulse amplitude of $U_T$ at a time which is short compared to the bit length. Initially, this is true only for the sampling circuit 16 to which the pulse is directly fed. At the output of the sampling circuit 16, the regenerated input signal occurs with the symmetrical pulse duty factor in the form of a rectangular pulse sequence superimposed upon a direct current voltage. This rectangular pulse sequence is differentiated in the differentiator 20 and after passage through the pulse former stage 21 is fed to the control input terminal of switch 22. The circuit for the derivation of the control signal for the switch 22 from the output signal of sampling 16 is selected to be such that only the rising edges of the rectangular pulse sequence as shown in FIG. 4c change the switch from the opened state to the closed state. The results of this is that the sampling circuit 17 stores a sampled value from the input side of the demodulated signal only when the sample value has a maximum value corresponding to the voltage of $U_1$. As a consequence, a direct voltage occurs as illustrated in diagram 4e which has a value of $U_1$ which occurs at the output of the sampling circuit 17.

This direct voltage is proportional to the respective mean value of the field strength of the received original signal and thus supplies the reference magnitude for the amplitude modulation of the AM demodulated signal. The limiting frequency of low pass filter 19 is dimensioned according to the highest used radio frequency (location dependent spacing of the attenuation maxima) and the maximally occurring relative speed between the transmission and reception vehicle. In this manner, it is assured that the maximum change in speed of the direct voltage at the output of the sampling circuit 17 will be completely transmitted through the low pass filter 19 whereas more rapid changes caused by interferences will be suppressed. Thus, at the output of the subtractor 18, the voltage wave illustrated by FIG. 4f is produced from the differences between the voltage $U_1 - U_2$ which are illustrated in FIG. 4a.

Thus, the invention provides an improved static distortion corrector and although it has been described with respect to preferred embodiments it is not to be so limited as changes and modifications may be made which are within the full intended scope as defined by the appended claims.

I claim as my invention:

1. A system for the reception of digital communication signals which are impressed on a carrier in the form of a binary frequency modulation, through a propagation medium that may have multi-path wave propagation and in particular for reception by mobile stations, long-distance traffic and scattered-ray systems in which information losses occurring as a result of phase and amplitude distortions are automatically detected in two mutually supplementary arrangements, one of which has a frequency discriminator, behind which a device for recognizing interference peaks caused by reflection distortions is connected, a circuit which compensates for these interference peaks, and the other arrangement contains an amplitude demodulator, which is connected in parallel with the frequency demodulator in another branch, wherein the outputs of both demodulators are supplied to a switch which is controlled by an amplitude modulation evaluation device and which with a detectable amplitude modulation of sufficient magnitude connects the amplitude demodulator, and which with detectable frequency modulation, connects the frequency discriminator, together with the interference-peck-recognizer, to a common output, and wherein the output of the AM demodulator includes a polarization inverter connected after it which is controlled by a polarity integrator, that reverses the AM demodulation product as a function of the height of the FM demodulation product characterized in that said AM demodulator contains at its output an alternating voltage separating circuit which includes a first and second sampling circuit (16, 17) with the second sampling circuit connected in parallel with the first sampling circuit, the first of said sampling circuits (16) controlled directly and the second sampling circuit (17) indirectly controlled with a switch (22), by a pulse (T) derived at the receiver from the incoming signal, said alternating voltage separating circuit contains at its output side, a subtractor (18) which receives inputs from said first and second sampling circuits, and said switch for the pulse feed to said second sampling circuit is actuated as a function of the changes in amplitude characteristic of the output signal of said first sampling circuit.

2. A system according to claim 1, wherein a low-pass filter (19) is connected between said second sampling circuit (17) and said subtractor (18).

3. A system according to claim 1, wherein the control input to said switch is connected to the output of the first sampling circuit through a differentiator (20) and a pulse-former stage (21).

4. An alternating voltage separating circuit for an AM demodulator for a digital communication system comprising, first and second sampling circuits each receiving the output of said AM demodulator, a subtractor receiving the outputs of said first and second sampling circits, and a pulse source connected to said first and second sampling circuits.

5. An alternating voltage separating circuit according to claim 4 including a low pass filter connected between the output of said second sampling circuit and said subtractor.

6. An alternating voltage separating circuit according to claim 5 including a switch between said pulse source and said second sampling circuit, and a differentiator connected to said switch and receiving an output of said first sampling circuit.

7. An alternating voltage separation circuit according to claim 6 including a pulse former stage between said switch and said differentiator.

* * * * *